United States Patent [19]
Hundeby

[11] Patent Number: 6,044,916
[45] Date of Patent: Apr. 4, 2000

[54] AGRICULTURAL IMPLEMENT WITH DOWN-FORCE CONTROL

[75] Inventor: David Robert Hundeby, Saskatoon, Canada

[73] Assignee: Flexi-Coil Ltd., Saskatoon, Canada

[21] Appl. No.: 08/891,204

[22] Filed: Jul. 10, 1997

[51] Int. Cl.[7] .................................................. A01B 59/043
[52] U.S. Cl. ............................................ 172/448; 172/637
[58] Field of Search ........................... 172/448, 439, 172/637

[56] References Cited

U.S. PATENT DOCUMENTS

| | | | |
|---|---|---|---|
| 4,558,881 | 12/1985 | Mantevfel | 172/448 X |
| 4,817,730 | 4/1989 | Winter | 172/448 X |
| 4,858,698 | 8/1989 | Williamson et al. | 172/448 |
| 5,497,837 | 3/1996 | Kehrney | 172/619 |
| 5,730,227 | 3/1998 | Hund | 172/448 X |

OTHER PUBLICATIONS

Fasse's Bearlink II . . . 33 Farm Show; Date Unknown.
Accord Pneumatic Seed Drills . . . (Brochure); Date Unknown.

*Primary Examiner*—Christopher J. Novosad
*Attorney, Agent, or Firm*—Anthony Asquith & Co.

[57] ABSTRACT

Down-force control is provided by a top-link, which presses down the rear end of a tool-bar carrying multiple rows of seeder tools. The height of the tool bar is set front and rear during operation. The top-link includes a hydraulic ram. The ram is supplied with pressure from a pressure-reducing-relieving valve, whereby the downward-force on the rear of the tool-bar remains constant during operation. The tool bar has side wings which are pressed down by a pressure that is regulated by the same valve. The system allows the seeder to maintain constant implantation depth, even over uneven ground.

18 Claims, 6 Drawing Sheets

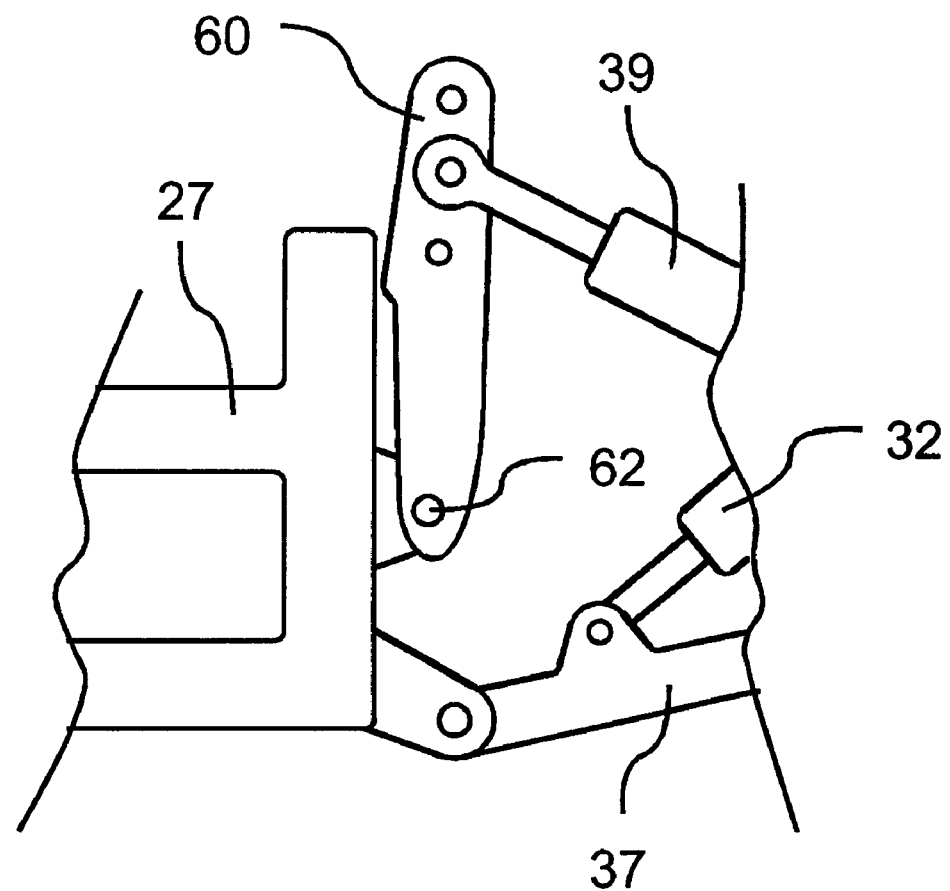
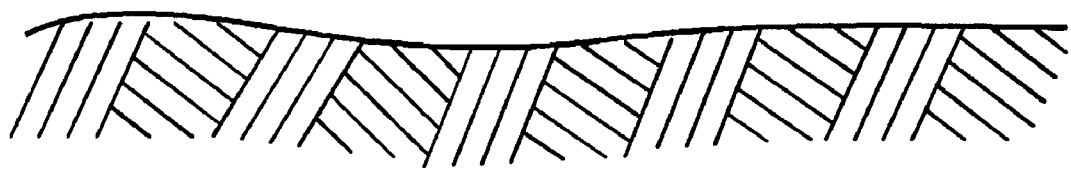
FIG.4B

AGRICULTURAL IMPLEMENT WITH DOWN-FORCE CONTROL

This invention relates to agricultural implements in which one of the factors that ensures the ground-penetrating tools of the implement are kept to the correct working depth, during operation, is that the weight of the tool-bar is supplemented by a press-down force. In some cases, the press-down force can be reacted against the tractor, or another suitable heavy object. In the case of a seeder apparatus, the press-down force can be reacted against a separately-movable frame carrying the seed hopper, behind which the tool-bar and seed implantation tools are towed. (In this specification, the term tractor includes any vehicle behind which a vehicle can be towed, and includes a vehicle which is itself towed behind another tractor.)

BACKGROUND TO THE INVENTION

For many crops that are planted from seeds, the depth in the ground at which the seeds are deposited can be a critical factor in the economical production of the crop. The economies follow from the accuracy with which the depth of penetration of the seed deposition tools into the soil can be maintained.

The height of the tool-bar can be set, by the farmer, by setting the height of the tool-bar relative to a wheel or wheels. Adjustable travel-limit stops, front and rear, can assist the farmer in getting the operational height of the tool-bar just right, relative to the wheels. The correct depth having been set, it is necessary for the tool bar to heavy enough to maintain that depth of penetration, even though the density of the soil might vary. If the tool-bar were too light, a local hard area of soil might cause the tool-bar to rise, and the depth of penetration to be lost. The supplementation of the weight of the tool bar by the press-down force ensures that the depth of penetration as set by the height of the tool bar relative to the wheels, is necessary to ensure the tools do not ride up over areas of harder soil.

The ground-penetrating tools are mounted in rows, the rows being spaced apart one behind the other. When the implement is being operated over uneven ground, i.e. over ground that can contain hills and valleys, a problem can arise over maintaining the press-down force at a constant magnitude.

The front row of tools are generally maintained accurately enough at the correct depth, because the front row of tools lies close to the rear of the tractor, seeder, or other heavy towing apparatus, and it is easy to transmit a substantial press-down forced to the front row of tools. But it is considerably more difficult to transmit a good push down force to the rear row of tools, and to keep that push-down force on the rear row constant as the implement passes over uneven ground.

Of course, sometimes the ground is level, in which case even the most simple design of press-down force arrangement will suffice. But when the ground is uneven, the task of ensuring a constant press-down force during up/down movements of the tool-bar over the uneven ground requires a more sophisticated design.

Some seeds are susceptible to quite small variations in deposition depth: as little as one centimeter or so in some cases.

The tool-bar is mounted from the tractor or seeder by means of a three-point-hitch. The front of the tool-bar can therefore be held at a fixed height relative to the tractor simply by adjusting the bottom link of the three-point-hitch to a particular height, and then locking the three-point-hitch at that height. The strut that sets the height of the bottom link relative to the tractor then serves to hold down the front of the tool-bar. Even when the ground is uneven, it is not so uneven that the front-row penetration would vary significantly. As mentioned, it is not the front but the back of the tool-bar that is difficult to press down.

As the rear of the tool bar can only be held down when a moment is produced about the ends of the rigid 3-point hitch, the use of a spring has been proposed. The spring being so mounted as to exert a moment or couple on the tool-bar, in the direction to urge the rear of the tool-bar downwards. However, if, during operation, the tool-bar should be inclined downwards relative to the tractor, the spring would have to extend, and the load in the spring, and hence the press-down force, would fall. Similarly, if the tool-bar should be inclined upwards, the spring would be compressed, and the press-down force would rise. Of course, this difficulty could be overcome if the load/length rate of the spring were low, whereby the force of the spring changed only a little with changes in length. However, it has been found that the rates of the push-down springs that can be accommodated on seeders and like implements have been too high and a spring with enough effective motion would be too large. Given the kind of unevenness of terrain in which it is desired to plant seeds, it has been found that the push-down force achievable with a spring varies too much.

It has also been proposed to include a rigid top-link to supplement the three-point-hitch. For operation, the bottom link of the three-point-hitch and the top-link are adjusted in length so that the tool-bar lies parallel to the (level) ground. When the tool-bar passes over uneven ground, the rigid top-link ensures that the angle of the tool-bar remains constant relative to tractor. Clearly, that condition does not favor the maintenance of a constant force on the rear row of tools. When a rigid top-link is used bridging of the implement occurs through valleys and the rear tools rise out of the ground over hills.

The rigid top-link systems that have been proposed have sometimes included a hydraulic ram as, or as a component of, the top-link. The purpose of such a ram was to enable the length of the top link to be adjusted; that is to say, a settable travel-limit-stop was incorporated into the ram or link, and the hydraulic action was used to move the link to that set limit, prior to operation. Once the limit was reached, during operation the hydraulic ram served as a rigid strut.

The invention is aimed at providing a constant press-down force on the rear of the tool-bar, whereby the seed implantation depth can be kept accurate over ground that is more uneven than has been possible with prior implements.

GENERAL FEATURES OF THE INVENTION

The preferred features of the invention may be summarised as follows.

The tool bar, which carries the two or more rows of tools, has a front end and a rear end. A bottom-link means is included for setting the height HF above the ground surface of a point TF on the tool-bar, being a point near the front end of the tool bar, and for maintaining the height HF constant, during operation. The tool bar is pivoted for Pitch-mode pivoting relative to the tractor. A point TR at the rear end of the tool bar is held fixed at a set height HR.

The apparatus includes a hydraulic top-link-ram, which is connected between the tractor and a point CF on the tool-bar. The point CF is a point on the tool-bar near the front end of the tool-bar, and is located above the point TF. The apparatus includes a means for supplying hydraulic pressure to the said hydraulic top-link-ram, and the said means includes a means for maintaining the hydraulic pressure supplied to the top-link-ram at a constant magnitude, the means being effective to keep the magnitude of the pressure constant even though the degree of extension of the top-link-ram may vary.

Preferably, the hydraulic pressure supplied to the top-link-ram during operation is regulated to a constant magnitude by means of a pressure-relieving-reducing valve.

DETAILED DESCRIPTION OF PREFERRED EMBODIMENTS

By way of further explanation of the invention, exemplary embodiments of the invention will now be described with reference to the accompanying drawings, in which:

FIG. 4b is a diagram of a portion of the assembly of FIG. 4a, shown in a non-working, raised-for-transport condition;

The apparatuses shown in the accompanying drawings and described below are examples which embody the invention. It should be noted that the scope of the invention is defined by the accompanying claims, and not necessarily by specific features of exemplary embodiments.

It is noted that not only seed depth, but seed spacing also is a key factor to economic production. Seeding has to be done in a single pass: there is no question of coming back later, and filling in rows of seeds between rows already planted. Because of mechanical limitations, often the seed implantation tools have to be spaced further apart laterally on the tool-bar than the desired spacing of the seeds. Therefore, the tools are provided in rows, sometimes several rows, and the desired close lateral spacing of the planted seeds is achieved by staggering the tools. But having several rows, spaced one behind the other, gives rise to the problem as described, namely the problem of maintaining constancy of press-down force over uneven ground.

Figure 1:
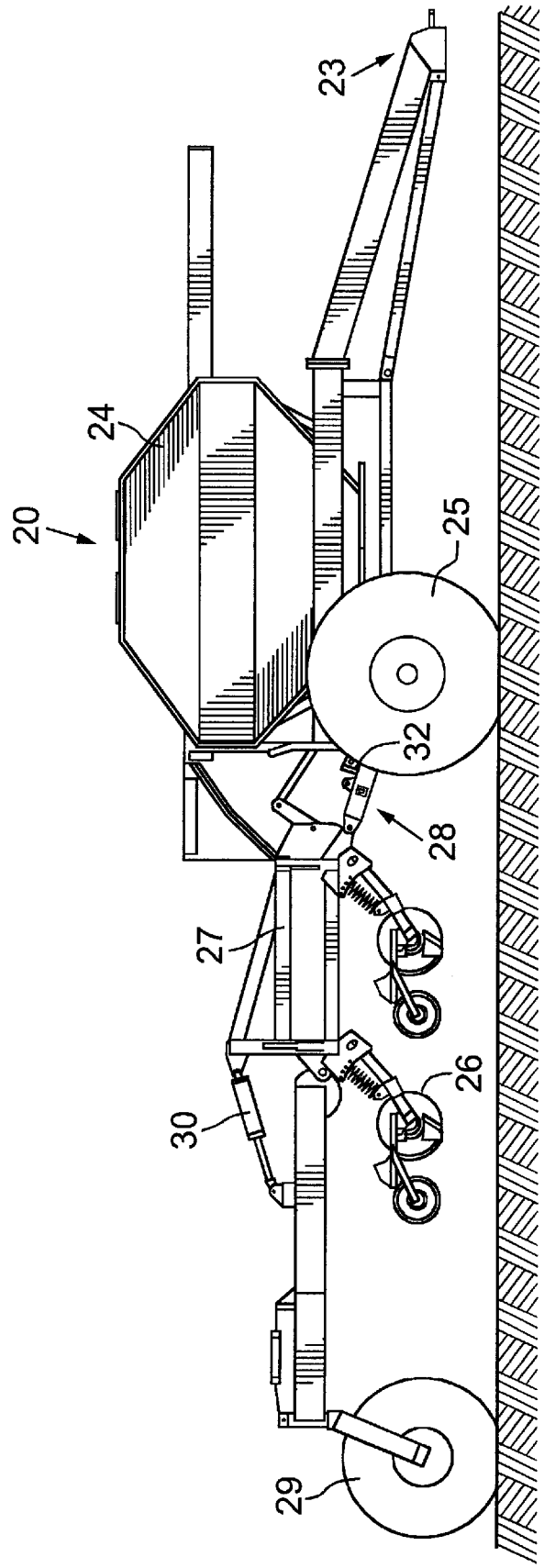
FIG. 1 is a side elevation of a seeder and tool-bar assembly that incorporates the invention, the assembly being shown in a non-operational condition.

In FIG. 1, a seeder 20, having a seed hopper 24, is towed by a tractor (not shown) connected at the hitch 23. The seeder is supported on wheels 25. Seed implantation tools 26 are adapted to receive seeds from the seeder, and to deposit the seeds in the ground. The tools 26 are carried on a tool-bar 27. The tool bar 27 is supported with respect to the seeder 20 by means of a three-point-hitch assembly 28, and with respect to the ground by means of a rear castor wheel 29. The rear wheel can be raised and lowered reative to the tool bar by means of a rear-wheel-ram 30.

Figure 2:
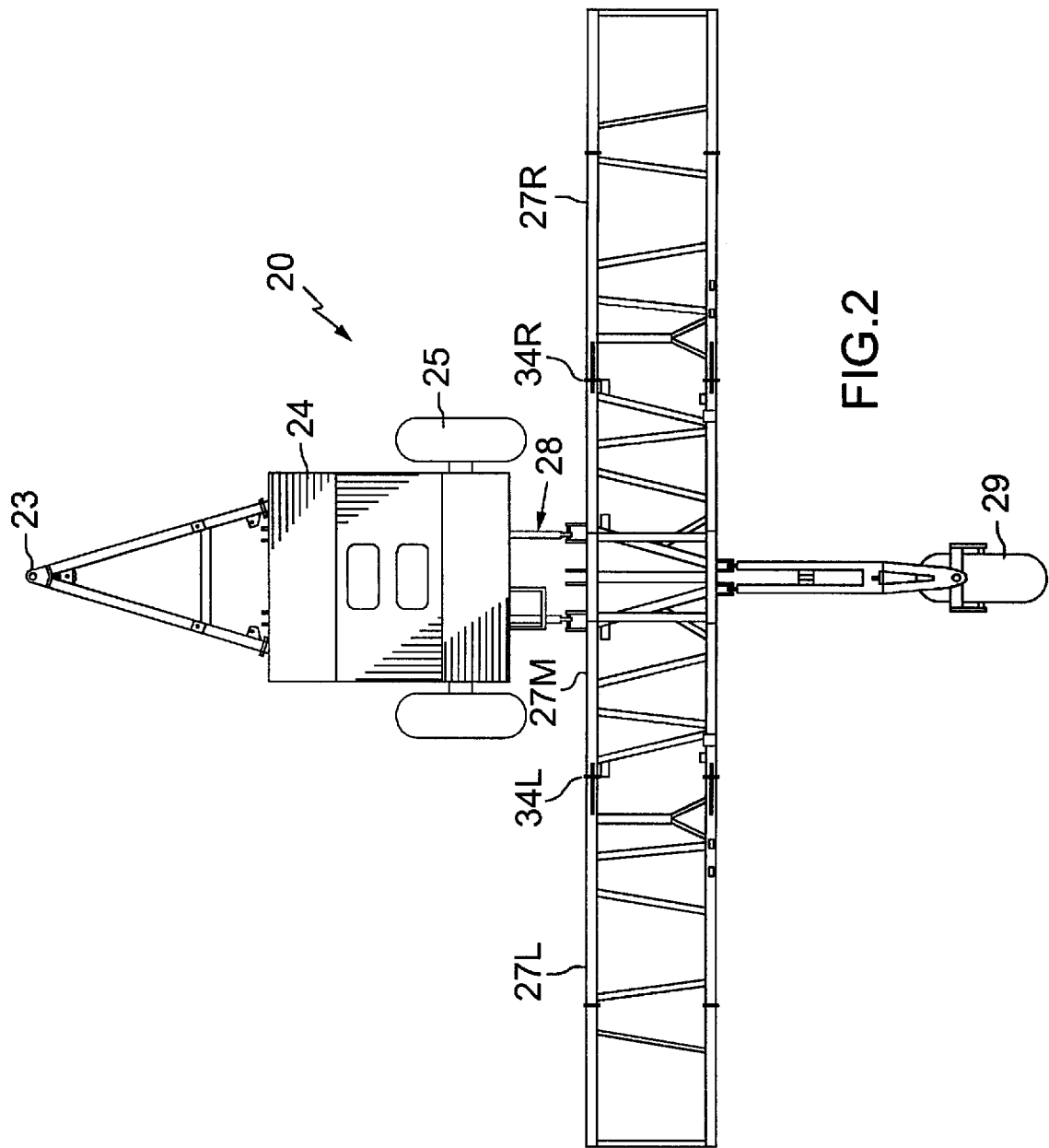
FIG. 2 is a plan view of the assembly of FIG. 1.

As shown in FIG. 2, the tool-bar 27 is included as a middle section 27M of a wide tool-bar assembly, which includes left and right side wings 27L,27R of the tool-bar assembly.

Figure 3:
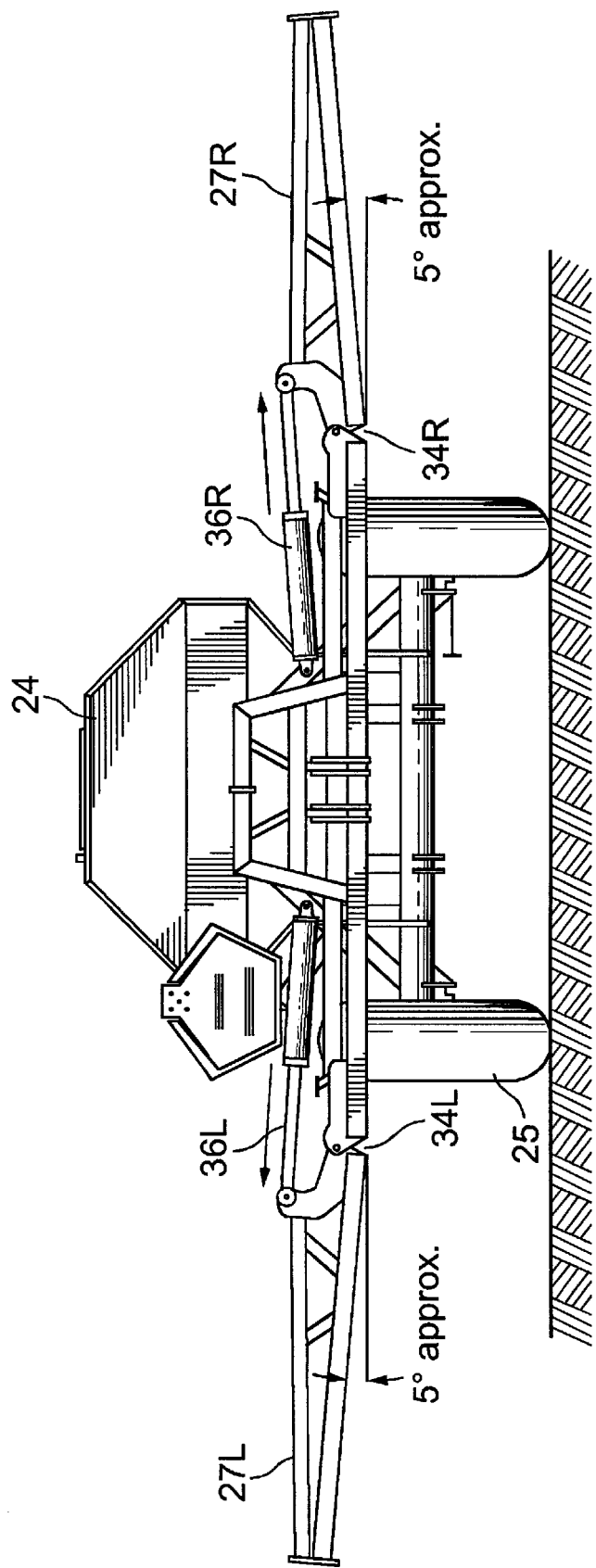
FIG. 3 is a rear elevation of the assembly of FIG. 1.

As shown in FIG. 3, the wings 27L,27R are pivoted to the middle section at hinges 34L,34R. The wings are raisable to a folded-up transport condition by operation of hydraulic wing-rams 37L,36R. The hydraulic wing-rams 36L,36R are also used to control the down-pressure on the wings.

The three-point-hitch assembly 28 is shown in more detail in FIG. 4. FIG. 4 shows the tool-bar 27 in the operational or "down" condition. In this condition, the rear of the tool-bar is down by virtue of the fact that the castor wheel 29 has been raised, and the front of the tool-bar is down by virtue of the fact that the bottom-link of the three-point-hitch 28 has been lowered.

The bottom-link 37 of the three-point-hitch is acted upon by a hydraulic bottom-link-ram 32. The height HF of the point TF at the front of the tool-bar is determined by the extension of the bottom-link-ram 32, which in FIG. 4 is shown fully extended. The height HR of the point TR at the rear of the tool-bar is determined by the extension of the rear-wheel-ram 30, which in FIG. 4 is shown fully contracted. The rams 30, 32 are provided with adjustment means, such as that shown at 38, whereby the farmer can adjust the heights HR, HF of points TR, TF for optimum seeding operation. The rams are controlled by hydraulic valve, 45.

As will be explained with reference to the circuit diagram FIG. 5, the base port of top-link-ram 32 and the rod port of rear-wheel-ram 30, being both connected to line A, are pressurized during operation. The pressure in line A is high enough that the two rams are held immovably against their respective limit stops during operation. Ram 30 is preferably provided with a mechanical stop while ram 32 has a hydraulic valve stop. Thus, during operation, the height HF of the point TF on the tool-bar is constrained to remain constant relative to the seeder 20, and the height HR of the point TR on the tool-bar is constrained to remain constant relative to the rear wheel 29.

Point TF is a pivot point, and the tool-bar 27 is able to pivot about the point TF, if the ground is uneven, i.e. if the implement should encounter hills and valleys. Such Pitch-mode motion of the tool-bar relative to the seeder 20 is controlled by a hydraulic ram 39. The ram 39 serves as a top-link between the seeder and the tool-bar, being connected to the tool-bar at point CF. When the base port of the top-link-ram 39 is pressurized, the ram applies a force to the point CF, and thereby exerts a downwards force to the rear end of the tool bar, i.e. a force which tends to press the rear of the tool-bar downwards. The reaction to the extra downwards force on the wheel 29 is of course experienced as a reduction of the weight on the wheel 25 of the seeder.

The magnitude of the downwards force on the rear end of the tool-bar depends on:

1. the pressure applied to the top-link-ram 39, and
2. the distance apart of the points TF and CF, and
3. the direction of force through point CF.

During operation, the base of the top-link-ram 39 is connected to line C, and the pressure in line C is subject, during operation, to the action of a pressure-reducing-relieving valve 40 (FIG. 5), by means of which the pressure in the line C is maintained substantially constant. The pressure-reducing-relieving valve 40 is of a conventional type, and is effective to keep the pressure constant, being effective to admit more pressure from the supply if the pressure should fall too low, and being effective to relieve pressure to exhaust if the pressure should rise too high. The valve arrangement is such that the farmer can set the values of the pressures, and preferably he can do so remotely, from the tractor cab.

As a result of the action of the pressure-reducing-relieving valve, the force exerted by the ram 39 on the tool-bar 27 remains constant, even if the extension of the top-link-ram 39 should change, i.e. even if the tool-bar should undergo Pitch-mode pivoting, due to the tool-bar passing over hills and valleys. To ensure that the constant force is maintained, the designer should see to it that the top-link-ram 39 has enough stroke that the ram does not encounter its limits of travel, neither in extension nor in contraction, during operation.

To raise the seed implantation tools 26 out of the ground, the tool-bar 27 is raised. That is to say, the rear-wheel-ram 30 is extended (which lowers the rear wheel 29) and the bottom-link-ram 32 on the three-point-hitch is contracted, which raises the point TF. The line B is pressurized (and line A exhausted) to achieve this condition.

Figure 5:
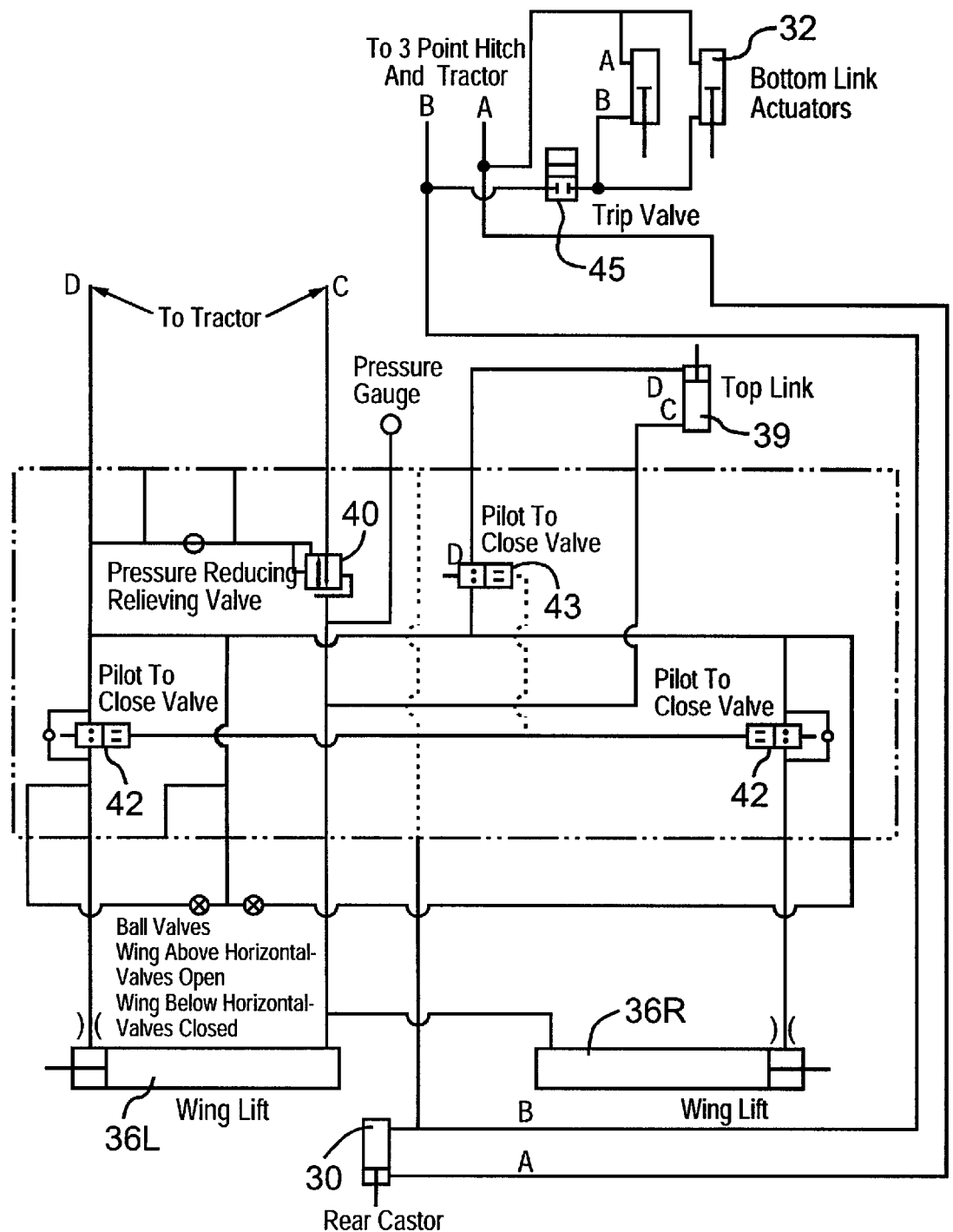
FIG. 5 is a circuit diagram of some hydraulic components used with the assembly of FIG. 1.

As shown in FIG. 5, the heights of the wings 27L, 27R of the tool-bar, which are set by the extension of the rams 36L, 36R, during operation are also under the control of the pressure-reducing-relieving valve 40, whereby a constant down-force is maintained on the wings during operation. When the line B is pressurized, i.e. when the tool-bar is raised, for non-operation, that pressure is conveyed to pilot-operated valves 42, which prevent the wings from being lowered. The pressure in line B also operates a top-link-pilot-valve 43, which closes the rod end of the top-link-ram 39, whereby the ram 39 cannot be operated while the tool-bar is raised, just as the wings cannot be operated while the tool-bar is raised. The top-link-ram 39 being then locked, it will be understood that the top-link-ram 39 and the bottom-link 37 now function as a parallelogram-linkage, whereby the tool-bar remains at a constant Pitch-angle relative to the seeder as the tool-bar is raised and lowered, by the action of the bottom-link-ram 32.

Figure 4A:
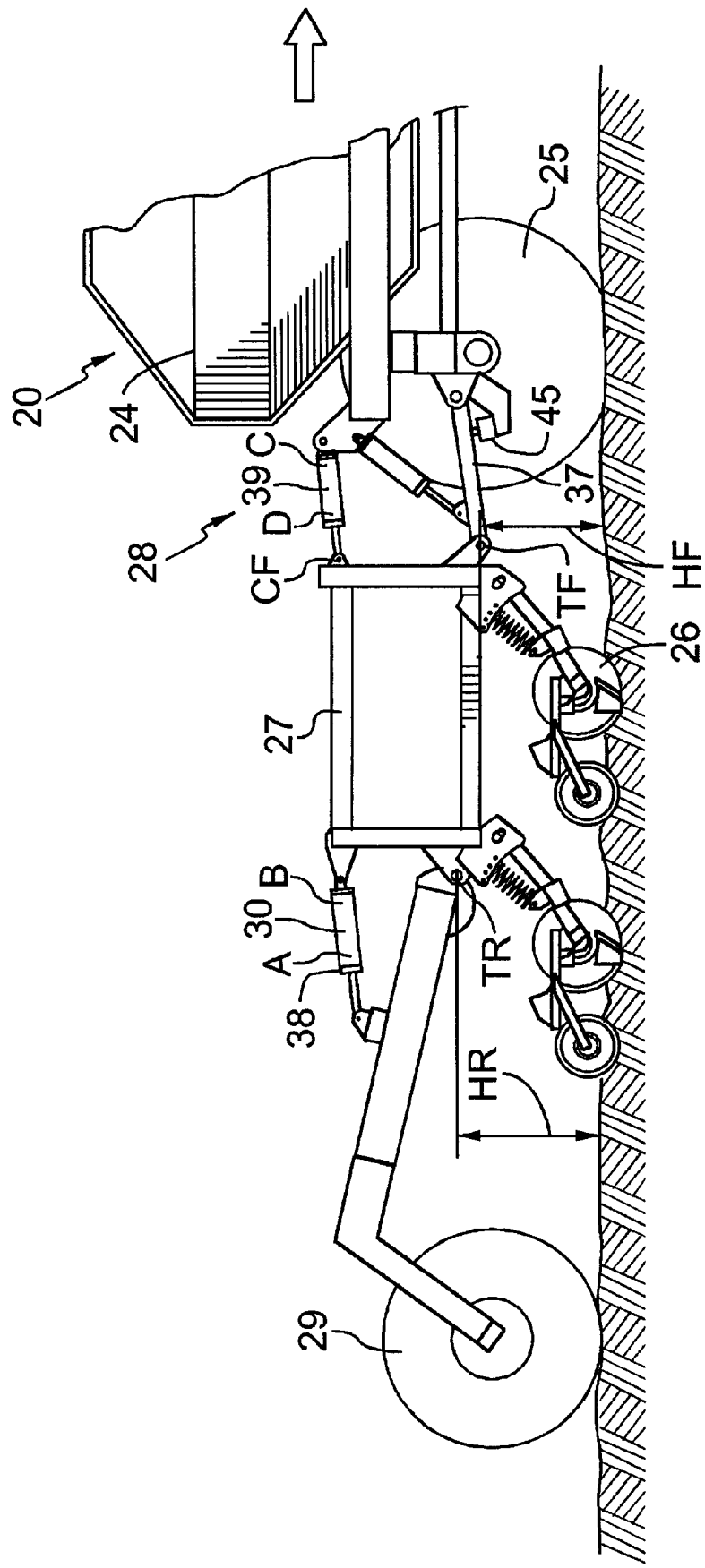
FIG. 4a is a diagram corresponding to FIG. 1 showing some of the components when the assembly is in an operational condition.

As shown in FIG. 4*a* in a preferable embodiment top-link ram 39 is not parallel with bottom link 37 and is connected to a further link pivotally attached to the tool-bar to permit pitch motion when in transport. For transport the tool-bar is raised causing further link collapse out of the abutment position to move away from abutment with the tool-bar. On being lowered the further link abuts the tool-bar and becomes fixed. In this embodiment the 3 point hitch does not act as a parallel link to raise the tool-bar because the top link provides no tension, only compressive forces.

The travel limit stop 38 on the rear-wheel-ram 30 comprises a mechanical stop on the rod of the ram's piston. The travel limit stop for the bottom-link-ram 32 (actually there are two bottom-link-rams 32 in parallel) comprises a hydraulic bottom-link-trip-valve 45. The extension of the bottom-link-ram 32 at which the valve 45 trips can be set by the farmer.

With the use of the system as described, during operation the tools 26 can be maintained at a constant depth of penetration into the soil, even though the ground might be uneven. If the ground is uneven, i.e. if the ground contains hills and valleys over which the implement must pitch, the heights HF and HR remain substantially constant relative to the ground surface, even though the tool-bar 27 may be somewhat tilted (in the Pitch-mode) relative to the seeder 20. Also if the ground is uneven, the push-down force on the tool-bar remains substantially constant, as a result of the maintenance of constant pressure in the top-link-ram 39. The push-down force in fact remains constant even if the Pitch-angle of the tool-bar should be considerable, due to the uneven ground.

For non-operation, the tools are withdrawn from the ground by raising the tool-bar 27, front and rear. The same hydraulic operation that raises the tool bar (i.e. the act of pressurizing line A) can be used not only to prevent the wings from then being lowered, but can also be used to disable the top-link ram. Therefore, the required operational safeguards and interlocks are provided automatically, and without the need for skilled attention to a check-list of procedures.

In an alternative embodiment, the position of the top link 39 and the bottom link 37 may be reversed.

I claim:

1. Apparatus for mounting an agricultural implement with respect to a towing tractor, wherein:

the implement includes a tool bar, on which are mounted one or more rows of ground-penetrating tools;

the tool bar has a front end and a rear end;

the tool-bar includes a point TF located near the front of the tool-bar, the point TF being a height HF above the ground surface and the apparatus includes a first-link means for setting the height HF above the ground surface;

the apparatus includes a means for maintaining the height HF constant, during operation;

the apparatus includes a means for permitting pitch-mode pivoting movement of the tool-bar relative to the tractor, about point TF;

the apparatus includes a hydraulically-operable second-link, which is connected between the tractor and a point CF on the tool-bar;

the point CF is a point on the tool-bar near the front end of the tool-bar, the point CF being spaced from the point TF;

the second-link is of such structure that its length, being the distance between the tractor and the point CF, can be changed by hydraulic operation;

the apparatus includes a means for supplying hydraulic pressure to the aforesaid second-link;

the second-link is effective, when operated by hydraulic pressure, to apply a force between the tractor and point CF, and thereby to exert on the tool-bar a moment about point TF;

the means for supplying hydraulic pressure to the second link includes a means for maintaining the hydraulic pressure at a constant magnitude;

and the means for maintaining the hydraulic pressure at a constant magnitude is arranged to be effective to keep the magnitude of the hydraulic pressure constant even through changes in the length of the second-link.

2. Apparatus of claim 1, wherein the tool-bar includes two or more of the aforesaid rows of ground-penetrating tools, the rows being arranged one behind the other, and including at least a front row and a rear row.

3. Apparatus of claim 2, wherein:

the means for maintaining the height HF fixed, during operation, comprises a means for keeping the point TF on the tool-bar fixed, during operation, relative to the tractor;

the first-link means for setting the height HF of the point TF on the tool-bar, relative to the tractor, is included in a three-point-hitch, the point TF on the tool-bar being coupled to a point on the hitch;

the means for setting the height HF includes an operable hydraulic hitch-ram, which is effective, when operated, to raise and lower the aforesaid point on the hitch, and thereby to raise and lower the point TF on the tool-bar;

the means for maintaining the height HF constant comprises a settable travel-limit-stop, which is effective to limit movement of the point TF below a predetermined height;

the travel-limit-stop includes a mechanically-operated hydraulic trip-valve;

the trip-valve is effective, when operated by mechanical movement of the first link to a point at which the height HF is the predetermined height, to lock the hitch-ram hydraulically;

the tool-bar includes a point TR located near the rear of the tool-bar, the point TR being a height HR above the ground;

the apparatus includes a rear-height-setting-means, for maintaining the height HR constant, during operation;

the rear-height-setting-means, for maintaining the height HR constant, is included in the means for supplying hydraulic pressure to the second-link;

the means for maintaining the hydraulic pressure supplied to the second-link at a constant magnitude comprises a pressure-reducing-relieving valve;

the tool-bar includes hydraulically-operable side wings, and the means for maintaining the hydraulic pressure supplied to the second-link at a constant magnitude is effective to keep the down-force on the wings constant also;

the rear-height-setting-means includes a rear-wheel;

the means for maintaining the height HR fixed, during operation, comprises a means for keeping a height HR, being the height of the point TR on the tool bar, fixed relative to the rear wheel, during operation;

the rear-height-setting-means includes a hydraulic rear-wheel-ram;

the rear-wheel-ram is arranged in the apparatus for raising and lowering the rear-wheel relative to the tool-bar;

the means for keeping the height HR fixed includes a height-limit-stop, having travel-limiting engagement with the rear-wheel ram;

the apparatus includes an operable means for raising the tool-bar, for non-working transport of the apparatus;

the apparatus includes a rear-wheel, mounted on the tool-bar, and a rear-wheel-ram for raising and lowering the rear-wheel relative to the tool-bar;

the means for raising the tool-bar comprises a means for operating the hitch-ram in the sense to raise the point TF, and a means for simultaneously operating the rear-wheel-ram in the sense to raise the point TR;

the apparatus includes a connecting-means, for connecting the second-link to the point CF on the tool bar;

the connecting-means includes a pivotal arm;

the geometrical configuration of the second link and the connecting-means is such that:

(a) when the tool-bar is not raised, upon a force being applied to the second-link in the sense to lower the rear of the tool-bar, the pivotal arm can abut the tool-bar in such manner as to transmit said force to the tool-bar;

(b) when the tool-bar is raised, upon a force being applied to the second-link in the sense to move the second link away from the tool-bar, the second-link can so move;

the aforesaid configuration is such that, when the tool-bar is raised, the movement of the pivotal arm is enough to separate the second-link from the tool-bar to such an extent that the raised tool-bar can undergo pitch-mode movements relative to the tractor, being movements of such magnitude as arise from transport of the apparatus, without interference from the second link.

4. Apparatus of claim 1, wherein the tools are seed-implantation-tools, supplied with seeds from a seed hopper carried on the tractor.

5. Apparatus of claim 1, wherein the means for maintaining the height HF fixed, during operation, comprises a means for keeping the point TF on the tool-bar fixed, during operation, relative to the tractor.

6. Apparatus of claim 5, wherein:

the first-link means for setting the height HF of the point TF on the tool-bar, relative to the tractor, is included in a three-point-hitch, the point TF on the tool-bar being coupled to a point on the hitch.

7. Apparatus of claim 6, wherein:

the means for setting the height HF includes an operable hydraulic hitch-ram, which is effective, when operated, to raise and lower the aforesaid point on the hitch, and thereby to raise and lower the point TF on the tool bar;

the means for maintaining the height HF constant comprises a settable travel-limit-stop, which is effective to limit movement of the point TF below a predetermined height.

8. Apparatus of claim 7, wherein:

the travel-limit-stop includes a mechanically-operated hydraulic trip-valve;

the trip-valve is effective, when operated by mechanical movement of the first link to a point at which the height HF is the predetermined height, to lock the hitch-ram hydraulically.

9. Apparatus of claim 1, wherein:

the tool-bar includes a point TR located near the rear of the tool-bar, the point TR being a height HR above the ground;

the apparatus includes a rear-height-setting-means, for maintaining the height HR constant, during operation.

10. Apparatus of claim 9, wherein:

the rear-height-setting means, for maintaining the height HR constant, is included in the means for supplying hydraulic pressure to the second link.

11. Apparatus of claim 10, wherein the means for maintaining the hydraulic pressure supplied to the second-link at a constant magnitude comprises a pressure-reducing-relieving valve.

12. Apparatus of claim 9, wherein:

the rear-height-setting-means includes a rear-wheel;

and the means for maintaining the height HR fixed, during operation, comprises a means for keeping a height HR, being the height of the point TR on the tool bar, fixed relative to the rear wheel, during operation.

13. Apparatus of claim 12, wherein:

the rear-height-setting-means includes a hydraulic rear-wheel-ram;

the rear-wheel-ram is arranged in the apparatus for raising and lowering the rear-wheel relative to the tool-bar;

the means for keeping the height HR fixed includes a height-limit-stop, having travel-limiting engagement with the rear-wheel ram.

14. Apparatus of claim 1, wherein the tool-bar includes hydraulically-operable side wings, and the means for maintaining the hydraulic pressure supplied to the second-link at a constant magnitude is effective to keep the down-force on the wings constant also.

15. Apparatus of claim 1, wherein the apparatus includes an operable means for raising the tool-bar, for non-working transport of the apparatus.

16. Apparatus of claim 15, wherein:

the apparatus includes a rear-wheel, mounted on the tool-bar, and a rear-wheel-ram for raising and lowering the rear-wheel relative to the tool-bar;

the tool-bar includes a point TR located near the rear of the tool-bar, the point TR being a height HR above the ground;

the first-link means for setting the height HF of the point TF on the tool-bar, relative to the tractor, is included in a three-point-hitch, the point TF on the tool-bar being coupled to a point on the hitch;

the apparatus includes an operable hydraulic hitch-ram, which is effective, when operated, to raise and lower the aforesaid point on the hitch, and thereby to raise and lower the point TF on the tool-bar;

the means for raising the tool-bar comprises a means for operating the hitch-ram in the sense to raise the point TF, and a means for simultaneously operating the rear-wheel-ram in the sense to raise the point TR.

17. Apparatus of claim 15, wherein:

the apparatus includes a connecting-means, for connecting the second-link to the point CF on the tool bar;

the connecting-means includes a pivotal arm;

the geometrical configuration of the second link and the connecting-means is such that:

(a) when the tool-bar is not raised, upon a force being applied to the second-link in the sense to lower the rear of the tool-bar, the pivotal arm can abut the tool-bar in such manner as to transmit said force to the tool-bar;

(b) when the tool-bar is raised, upon a force being applied to the second-link in the sense to move the second-link away from the tool-bar, the second-link can so move.

18. Apparatus of claim 17, wherein the aforesaid configuration is such that, when the tool-bar is raised, the movement of the pivotal arm is enough to separate the second-link from the tool-bar to such an extent that the raised tool-bar can undergo pitch-mode movements relative to the tractor, being movements of such magnitude as arise from transport of the apparatus, without interference from the second-link.

* * * * *